United States Patent
Kunsman et al.

(10) Patent No.: US 6,264,251 B1
(45) Date of Patent: Jul. 24, 2001

(54) SEGMENTED FLANGE COUPLER FOR GROOVED PIPE

(75) Inventors: Donald R. Kunsman, Bethlehem, PA (US); Douglas R. Dole, Whitehouse Station, NJ (US)

(73) Assignee: Victaulic Company of America, Easton, PA (US)

(*) Notice: Subject to any disclaimer, the term of this patent is extended or adjusted under 35 U.S.C. 154(b) by 0 days.

(21) Appl. No.: 09/418,894

(22) Filed: Oct. 15, 1999

(51) Int. Cl.$^7$ .................................................. F16L 23/00
(52) U.S. Cl. ..................... 285/405; 285/415; 285/414; 285/411
(58) Field of Search ........................... 285/415, 411, 285/414, 363, 413, 420, 368, 405

(56) References Cited

U.S. PATENT DOCUMENTS

| | | | |
|---|---|---|---|
| 406,272 | * 7/1889 | Euvrard | 285/415 |
| 406,888 | 7/1889 | Davis . | |
| 630,641 | * 8/1899 | Albree | 285/413 |
| 696,603 | 4/1902 | Smith . | |
| 1,784,667 | 12/1930 | Gillet . | |
| 3,469,852 | 9/1969 | Smith et al. . | |
| 3,515,416 | 6/1970 | Pickert . | |
| 3,895,833 | 7/1975 | Thiessen . | |
| 3,910,610 | 10/1975 | Turner et al. . | |
| 4,170,260 | 10/1979 | Rudd et al. . | |
| 4,519,639 | * 5/1985 | Florian | 285/415 |
| 5,314,215 | 5/1994 | Weinhold . | |

FOREIGN PATENT DOCUMENTS

| | | |
|---|---|---|
| 2310518 | 12/1976 | (FR) . |
| 0006709 | 5/1886 | (GB) . |

OTHER PUBLICATIONS

Styles 741 and 743 Flange Adapters (Victaulic Mechanical Piping Systems Condensed Catalog, pp. 11 & cover [undated]).
Style 344 Flange Adapter ("Victaulic Installation and Assembly," pp. 1 and 2, 1995).
Styles 7012 and 7013 Flange Adapters (Grinnell catalog, p. 14 [undated]).

* cited by examiner

Primary Examiner—Anthony Knight
Assistant Examiner—Aaron Dunwoody
(74) Attorney, Agent, or Firm—Abelman, Ffaryne & Schwab

(57) ABSTRACT

A segmented flange coupler is disclosed for connecting the free end of a grooved pipe to a fitting having a flange connector. The segmented flange coupler is formed of end-to-end connected individual coupling segments which are configured to move both circumferentially and radially into concentricity during the tightening of their connecting bolts. This is achieved by providing complementary surfaces of revolution about their overlapped bolt receiving apertures. These surfaces of revolution are preferably in the form of mating convex and concave conical surfaces.

15 Claims, 16 Drawing Sheets

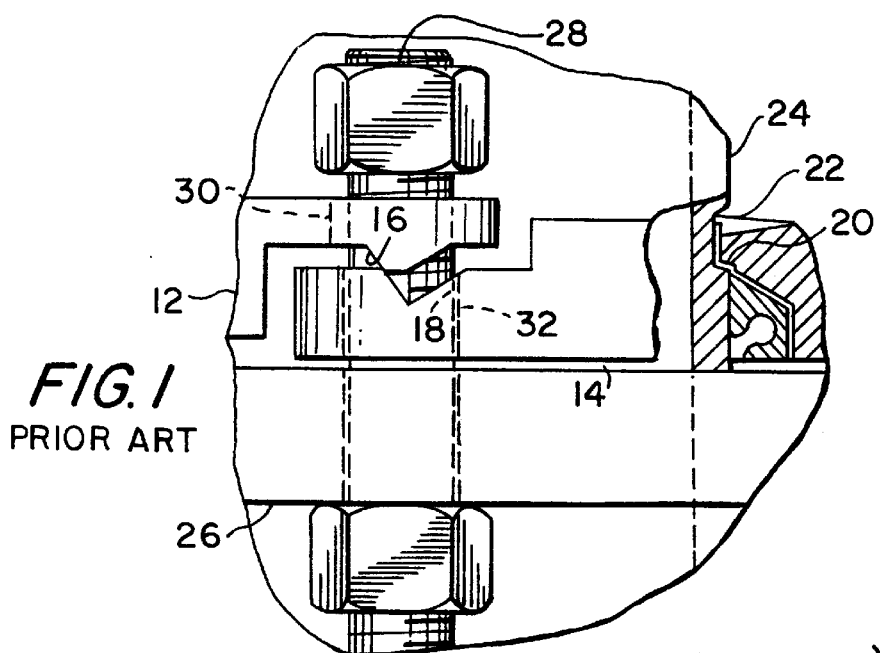
FIG. 1 PRIOR ART
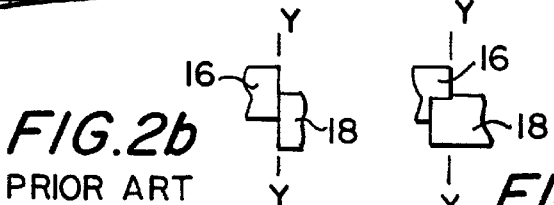
FIG. 2b PRIOR ART
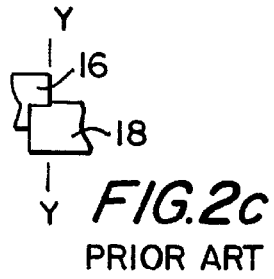
FIG. 2c PRIOR ART
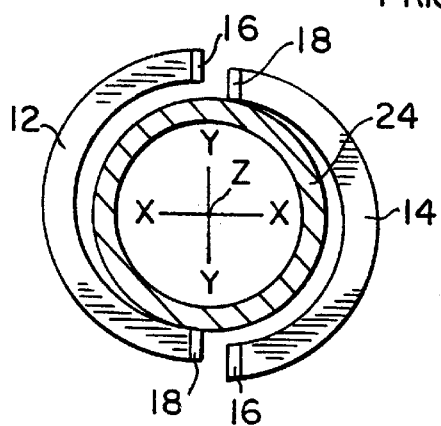
FIG. 2a PRIOR ART
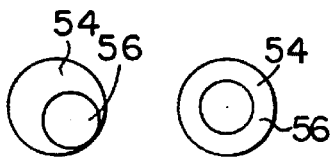
FIG. 7b  FIG. 7c
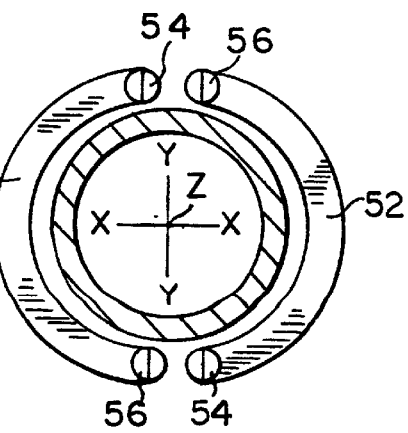
FIG. 7a

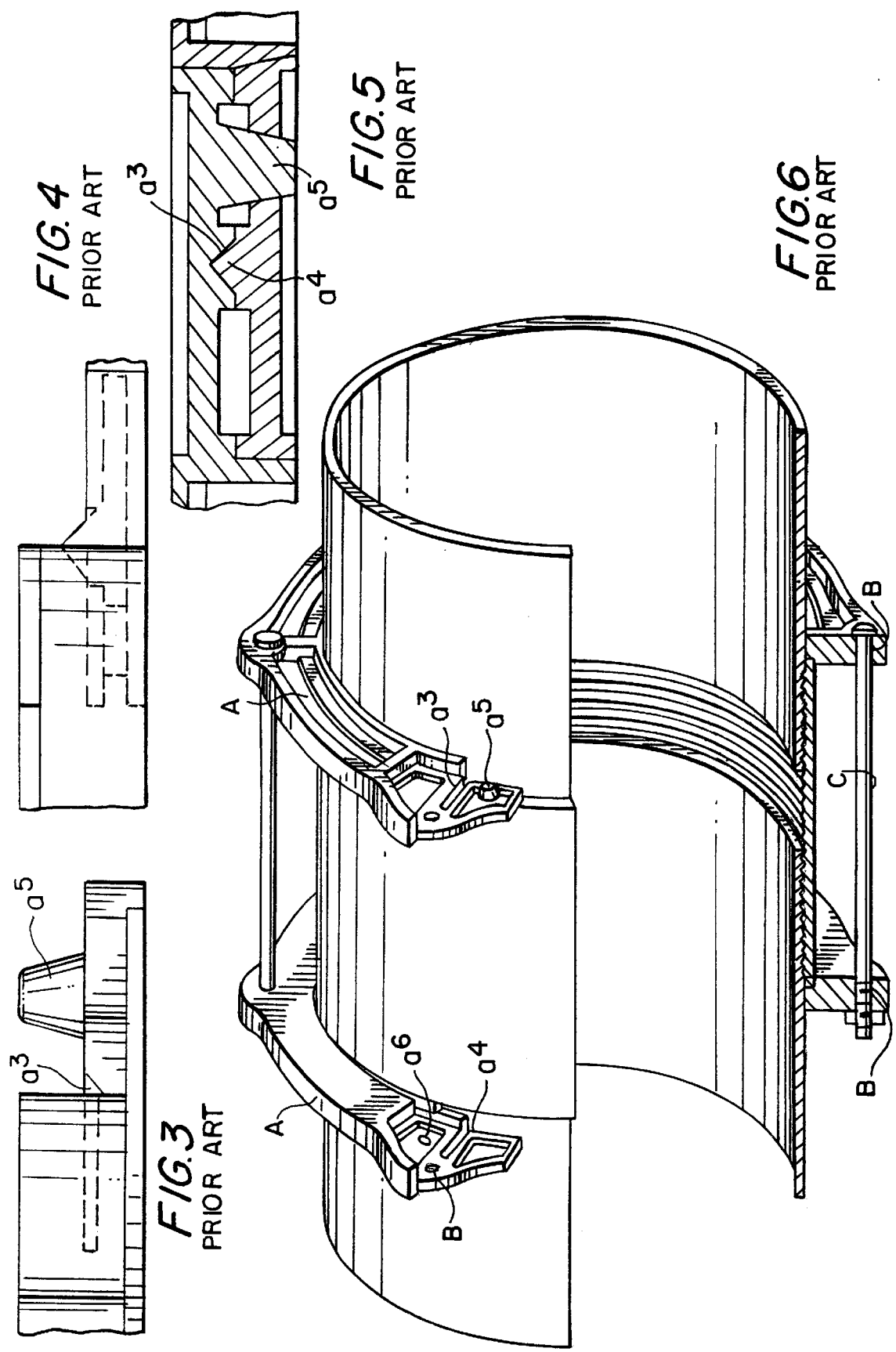

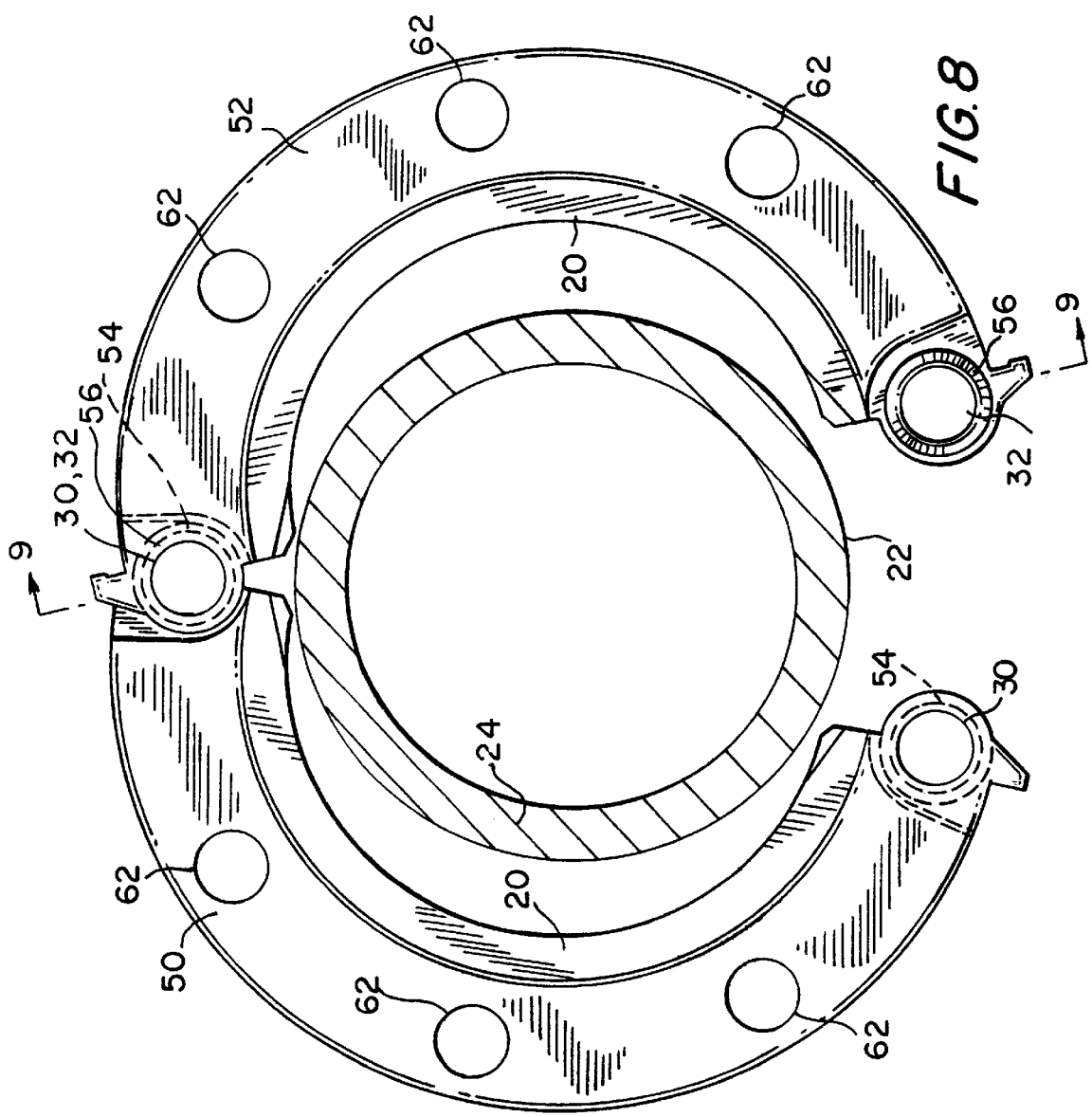

SEGMENTED FLANGE COUPLER FOR GROOVED PIPE

FIELD OF THE INVENTION

This application relates to a segmented flange coupler, whereby a pipe having a groove formed in its external circumference adjacent a free end of the pipe, can be connected directly to a fitting having a flanged connection.

BACKGROUND OF THE INVENTION

It is presently known to form such a segmented flange coupler from a plurality of coupling segments, generally arcuate in shape, which are bolt connected in an end-to-end relationship about the circumference of the pipe. Typically two such coupling segments, of a generally semi-circular shape, are employed. However for large pipe sizes three or more coupling segments may be utilized.

The ends of the coupling segments include bolt receiving apertures for connecting the successive coupling segments together. The coupling segments typically include a key which extends within a circumferential groove of the pipe. Oftentimes the pipe may be somewhat out of round such that the bolt receiving holes of the successive coupling segments will not line up. Accordingly, appreciable force must then be applied to appropriately bring the coupling segments together, as near as possible, to appropriately engage the pipe circumference.

Typically, such prior constructions, for example, the Style 741 segmented pipe coupling available from the Victaulic Company of America, has included radially extending ears at the ends of the coupling segments being bolt connected. The ears must then be engaged with a tool, such as a pliers or channel lock, to bring the ears together such that the bolt can pass through the overlapped apertures for the tight connection of the adjacent coupling segments. Further, it has been experienced that the bolt receiving apertures in such coupling segments must be located with a high degree of accuracy.

Other constructions are also known to bring the adjacent coupling segments into circumferential alignment.

Thiessen, U.S. Pat. No. 3,895,833, provides a flange adapter for use in such a situation. Thiessen's flange adapter includes two or more coupling segments that are connected to each other in end-to-end relationship by means of bolts that are employed to secure the respective coupling segments directly to the flange of the fitting.

Thiessen employs ramp cams on the respective ends of his coupling segments that are interengaged when the coupling segments are assembled onto the grooved pipe. The ramp cams cause circumferential movement of the assembled segmented pipe coupling at the time the bolts are tightened down. This causes the respective flange segments to bottom down on the bottom wall of the groove formed in the pipe, and provide a circumferential alignment between the pipe and the fitting.

However, the provision of such ramp cams carries with it a disadvantage that the flange segments must either be assembled relative to each other prior to the insertion of the traction bolts, with the ramp cams on the respective flange segments interengaged or, the keys of the respective segments must be of lesser width than the width of the pipe groove. If, however, the keys do not engage the side walls of the pipe groove, then, a flexible coupling results, as opposed to a rigid intercoupling of the pipe and the associated fitting.

There is no provision for radial alignment, and hence no guarantee that the flange segments will be truly concentric as related to the longitudinal axis of the assembled coupling, and in turn, as related to the longitudinal axis of the pipe.

Free play of the bolts in the bolting pads of the respective flange segments, will permit the ends of the respective flange segments to be displaced in the radial direction relative to the juxtaposed flange by a distance that is equal to the difference between the diameter of the bolt holes in the respective flange segments and the diameter of the bolts employed for securing the respective segments to each other.

Further, Thiessen's ramp cams, which extend radially of the axis of the coupling, are inoperative to produce any force that acts to move the respective flange segments into concentric relationship relative to the central axis of the coupling.

This can cause problems at the time the flange segments are tightened onto the fitting by means of the bolts if the flange segments at that time are out of concentric alignment. As a consequence they do not bottom down correctly on the bottom wall of the pipe groove, until such time as they are forced into concentric relation by their engagement with the bottom wall of the pipe groove. However, at the time the bolts are being tightened down, to cause the diameter of the flange coupling to decrease, there then exists a considerable frictional restraint against any radial movement of the flange segments relative to each other, with the consequence that the flange segments are not truly concentric with each other. Hence there is no guarantee that the flange segments have in fact bottomed down correctly into full face engagement with the bottom wall of the pipe groove.

If the segments have in fact not bottomed down fully on the bottom wall of the pipe groove, then, the strength of the interconnection is materially affected, as is the probability that a rigid connection has not been effected between the pipe and the fitting by the flange segments. In such a situation, the pressure that the coupling can withstand will be reduced.

Smith U.S. Pat. No. 696,603 discloses a pipe coupler having two pairs of interfitting projections and recesses. One of the pairs is provided for initially locating the adjacent coupling segments during their initial assembly. The other pair is provided to circumferentially align the coupling segments. As was the situation with Thiessen, there is no provision for radial alignment of the adjacent coupling segments. Hence the Smith construction will not automatically provide for the concentric location of the segmented pipe coupling about the pipe.

SUMMARY OF THE INVENTION

It is an object of this invention to provide a segmented flange coupling that, prior to and during tightening down of the traction bolts will move both circumferentially and radially into truly concentric relationship with each other, and also into truly concentric relationship with the bottom wall of the pipe groove. This movement advantageously provides a segmented flange coupler that is entirely predictable in its securement of the pipe to the fitting, such that true rigidity of the pipe relative to the fitting is accomplished in an entirely automatic self-adjusting manner.

The present invention employs interfitting surfaces of revolution, preferably cones, on the ends of the respective flange segments about the bolt receiving apertures. These interfitting surfaces, which may initially interengage with each other in a random position of concentricity of the flange segments, then act to draw the flange segments into true concentricity as the bolts are tightened down.

BRIEF DESCRIPTION OF THE DRAWINGS

Preferred embodiments of the present invention will be described with reference to the accompanying drawings, in which:

FIG. 1 is an illustration of the prior art segmented flange coupler, as taught by U.S. Pat. No. 3,895,833.

FIGS. 2a, 2b and 2c diagrammatic representations of the prior art segmented flange coupler of FIG. 1. These FIGS. illustrate the problem with the prior art construction, which results in lack of concentricity of the flange segments both prior to and subsequent to tightening down of the coupler.

FIG. 3 is an illustration of one end of a prior art segmented flange coupler as taught by U.S. Pat. No. 696,603.

FIG. 4 shows the opposite end of the prior art segmented flange coupler of FIG. 3.

FIG. 5 shows the interengagement at the ends of two successively located segments corresponding to FIGS. 3 and 4.

FIG. 6 is a perspective view partially in section, which show a pair of such coupling rings about the pipe joint of U.S. Pat. No. 696,603.

FIGS. 7a, 7b and 7c are diagrammatic illustrations of the principles employed in the present invention in order to accomplish concentricity of the respective flange segments during the tightening down of the segmented flange coupler.

FIG. 8 illustrates a segmented flange coupler according to the present invention when in an initial, open, and partially assembled condition.

FIG. 9 is a partial cross-section taken along line 9—9 in FIG. 8 and looking in the direction of the arrows.

DESCRIPTION OF THE PRIOR ART

Figure 10:
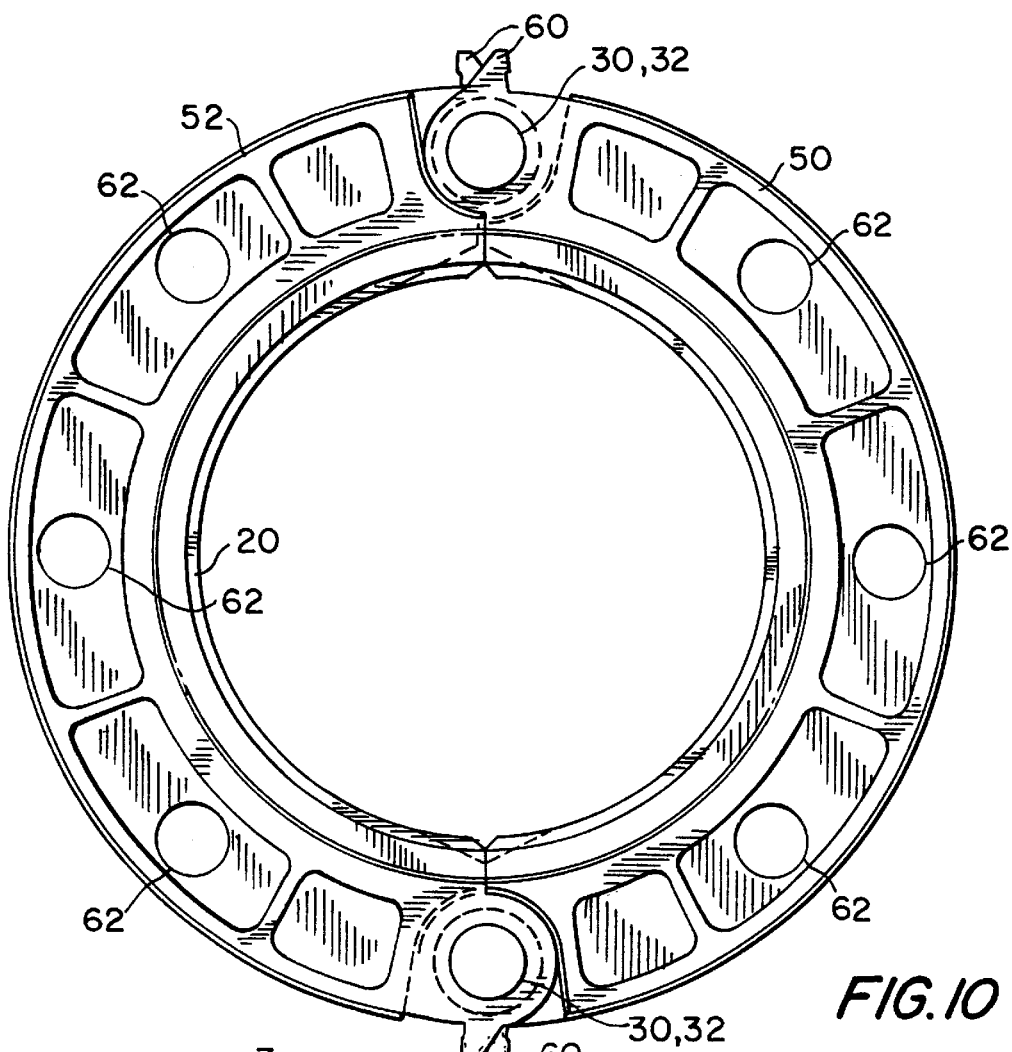
FIG. 10 illustrates the segmented flange coupler of the present invention when in a fully assembled condition.

Referring initially to FIG. 1, this prior art construction of Thiessen, U.S. Pat. No. 3,895,833, includes flange segments 12 and 14 which, in their entirety, are arranged in an end-to-end interengagement.

The flange segment 12 has a ramp cam 16 at its end engaged with the flange segment 14. Flange segment 14 has a complementary caming groove 18. During tightening down of the coupling the ramp cam 16 rides along the juxtaposed surface of the caming groove 18 to produce closure of the flange coupler, and, the reduction of its initial internal diameter in order to bring keys 20 into seated engagement with groove 22. Groove 22, in the well known manner, has been machined in the outer circumference of a pipe 24 to be attached to a fitting 26. Thus, the tightening of bolts 28 cause the flange coupler to contract in diameter, and alternately, to be clamped directly onto the juxtaposed face of the fitting 26.

This prior art construction does not provide concentric radial alignment of flange segments 12, 14 and may not provide a rigid interconnection between the pipe and the fitting.

There are two forms of flange couplers known in the industry, the first being a "flexible" coupling which will permit limited axial movement of the pipe 24 and angular displacement of the pipe, and, a "rigid" coupling which inhibits axial movement of the pipe, and, which also inhibits angular displacement of the pipe.

As will be apparent from the following discussion of FIGS. 2a–2c, this prior art coupling is ineffective as a "rigid" coupling, and, in the event that it has been designed to provide a "rigid" coupling, can only provide rigidity in a haphazard and unpredictable manner. As illustrated in FIG. 2a, at the time the flange segments 12 and 14 are assembled onto the pipe there is no automatic radial alignment of the flange segments 12, 14. Hence, they will not be in truly concentric arrangement, particularly if pipe 24 is out of round. The bolt holes 30 and 32 in the respective flange segments 12 and 14 must be made considerably oversized with respect to the diameter of the bolt shank 28. This is necessary in order to permit the ramp cam 16 to ride down the caming groove 18 to provide the necessary tightening down of the flange segments 12, 14 into seated arrangement in the pipe groove.

However, this oversizing of the bolt holes 30 and 32, can, as illustrated diagrammatically in FIG. 2a, results in offsetting of the respective flange segments 12 and 14 on the diameter thereof relative to each other. Unless the center of generation of the respective flange segments 12 and 14 is correctly located on the X—X axis, as illustrated in FIG. 2a, then, the ramp cams 16 will be engaged with the caming grooves 18 in an offset relationship. They will then remain in that relationship during tightening down of the bolts 28, there being no force available for adjusting the bolting pads of the respective flange segments 12 and 14 relative to each other in the radial direction of the Y—Y axis, in order to bring the flange segments into true concentricity with the pipe axis Z.

As is illustrated diagrammatically in FIG. 2b, the interengageable surfaces of the ramp cam 16 and caming groove 18 initially become engaged in an offset relationship relative to the Y—Y axis. As illustrated in FIG. 2c, not only do they remain in that relationship until such time as the keys 20 engage the bottom wall of the pipe groove 22, which possibly would be capable of providing an alignment force in the direction of the Y—Y axis, but, they must then be of a sufficient magnitude to overcome the frictional movement provided by (a) the interengaged ramp cam 16 and caming groove 18, (b) the engagement under strong compressive pressure of the flange segment 14 with the juxtaposed wall of the fitting 26, and (c) the frictional engagement between the head of the traction bolt 28 with the flange segment 12.

Further, the inclusion of the ramp cams 16 and caming grooves 18 preclude the common manner of assembly of the flange coupler onto the pipe in the usual manner. The "usual manner" is to pass a bolt through the bolt receiving apertures at one of the juxtaposed ends of the flange segments and then swing the flange segments about the axis of the bolt into a splayed position in which they can be positioned over the pipe. The bolt is inserted into the bolt hole in the fitting to initially secure the flange segments to the fitting, prior to the keys of the flange segments being passed into the pipe groove 20. This allows the diametrically opposite bolt to then be passed through the bolt receiving apertures in the opposite ends of the flange segments, and then through the bolt hole in the fitting.

Due to the ramp cams and caming grooves, of necessity, comprising planar surfaces that extend parallel to the Y—Y axis at an angle to the Y—Z plane, the Thiessen flange segments cannot be pivoted relative to the bolt axis, unless the ramp cam and caming groove are displaced in opposite directions relative to each other along the bolt axis. This, in turn, requires a different mode of assembly of this prior art coupling. The flange segment 14 has to be first moved into engagement of its key 20 with the groove 22. The flange segment 12 then has to be first moved into proper position relative to the flange segment 14 and then have its key 20 fitted into the pipe groove 22. Subsequently both of the diametrically opposite bolts must be inserted through the ends of the flange segments and passed through the bores in the fitting 26. That is, there is no opportunity of swinging the flange segments into a splayed position, securing them to the fitting 26 in that splayed position, then positioning the grooved pipe 24 to receive the keys 20 of the flange segments, then swinging the flange segments into concentric arrangement, and then, inserting the diametrically opposite bolt, subsequent to which both of the bolts are then torqued down to produce the assembled coupling.

Commonly, intermediate bolt holes are provided between the ends of the respective flange segments for the reception of additional bolts, which, after initial assembly of the flange coupler onto the pipe and onto the fitting, are then inserted through the respective flange segments and the fitting to fully secure the flange coupler to the fitting.

If, and as has previously been described, and as is probable, the Thiessen flange segments are not in true concentricity, then, the keys of the flange segments will not be in true concentricity with the pipe exterior and the bottom wall of the groove in the pipe. As a result, upon tightening down of the coupling, there still will be a lack of concentricity of the keys with the bottom wall of the pipe groove. This can disadvantageously result in point engagement of the keys with the bottom wall of the groove at diametrically opposite positions on the circumference of the pipe groove, and, spacing of the keys from the bottom wall of the pipe groove at all positions intermediate those points. This precludes the possibility of providing a predictable rigid coupling in which the keys of the flange segments are fully engaged with the bottom wall of the pipe groove, the clamping force exerted by the keys on the bottom wall of the pipe groove being continuous circumferentially of the bottom wall of the pipe groove, and of substantially identical clamping force at all positions circumferentially of the pipe.

Referring now to FIGS. 3–6 which show the clamping ring for a pipe coupling in accordance with prior art Smith U.S. Pat. No. 696,603, the semicircular segments A include an interlocking aligning structure at their opposed ends to provide only circumferential alignment between the connected coupling segments. This circumferential alignment is provided by the cooperative engagement of the groove or recess $a^3$, which is preferably V-shaped in cross section, and disposed radially with respect to the center of coupling segment A. The opposing part of the other section is provided with a rib or projection $a^4$ which is exactly of the same size and shape of the recess $a^3$, and adapted to fit accurately therein when the two coupling segments A are drawn together, with the rib $a^4$ also being preferably arranged radially with respect to the center of the ring. It is to be noted that the interengaged rib $a^4$ and recess $a^3$ are spaced from the apertures B which receive the connecting bolt C. To assist in the initial assembly of the sections A of the ring, which can be of substantial weight, Smith also provides one of the overlapping portions of each joint with a retaining stud $a^5$ adapted to pass loosely into a hole or recess $a^6$ in the other part which serves to retain the two segments A together around the pipe until the clamping bolts C are inserted in place. It is to be noted that the interengagement of $a^5$ and $a^6$, which is also displaced from the bolt receiving apertures B, is only provided to facilitate the initial placement of the two sections A and does not provide any alignment thereof. As was the situation with Thiessen, Smith's engagement of projection $a^4$ and recess $a^3$ does not provide radial alignment of segments A.

DETAILED DESCRIPTION OF THE PREFERRED EMBODIMENTS

Before proceeding to a description of the preferred embodiments of the present invention, reference is again made to diagrammatic FIGS. 2a–2c and 7a–7c to outline the basic underlying concept of the present invention, and, the manner in which the present invention differs from the operation of the prior art structures.

In FIGS. 2a–2c, while contraction of the flange coupler in directions circumferentially of the pipe is accomplished, there are no forces produced during tightening down of the flange coupler that would cause the flange segments 12 and 14 to radially move into true concentricity.

The present invention provides a structure that will automatically cause the respective flange segments to move into true concentricity during the tightening down of the coupler bolts resulting in concentricity of the keys of the flange segments with the bottom wall of the pipe groove. This ensures a desired firm engagement of the keys with the pipe groove, and thus to provide a truly predictable "rigid" coupling between the pipe and the fitting, i.e., a coupling in which axial and angling movements of the pipe relative to the fitting are limited.

Referring to FIGS. 7a–7c, according to the present invention, interfitting surfaces are provided at the respective ends of the arcuate flange segments 50, 52 that provide for movement of the flange segments not only in the direction of the X—X axis, but also radially in the direction of the Y—Y axis, such omnidirectional movements being produced upon relative movement towards each other of the flange segments in the direction of the Z axis.

Figure 11:
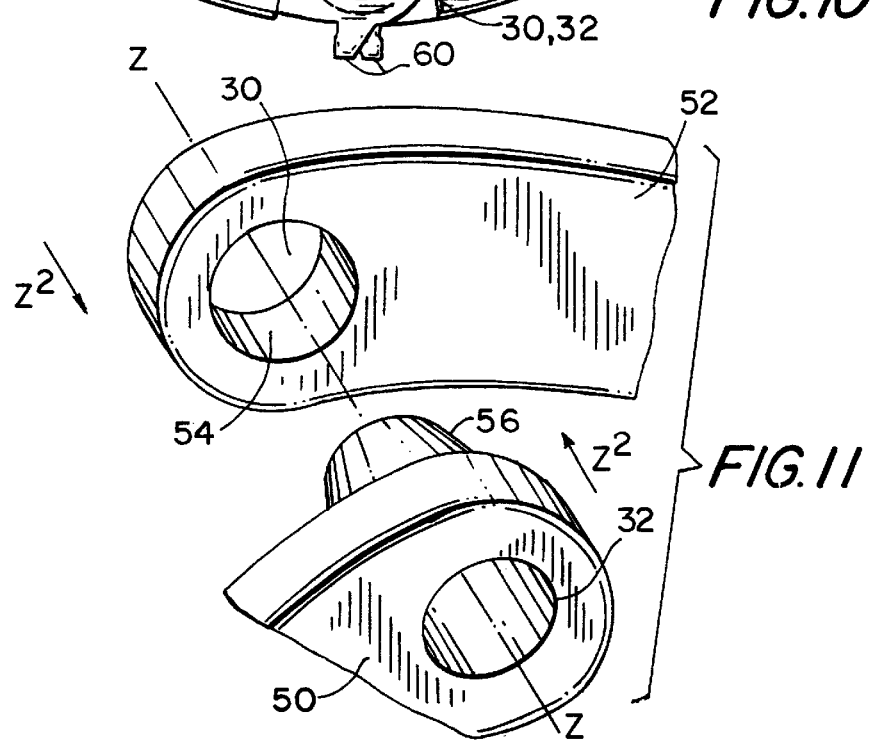
FIG. 11 is a diagrammatic perspective view illustrating diagrammatically the convex conical projection provided on one end of one of the flange segments, and, the complementary concave conical recess provided at the end of the next adjacent flange segment.
Figure 14:
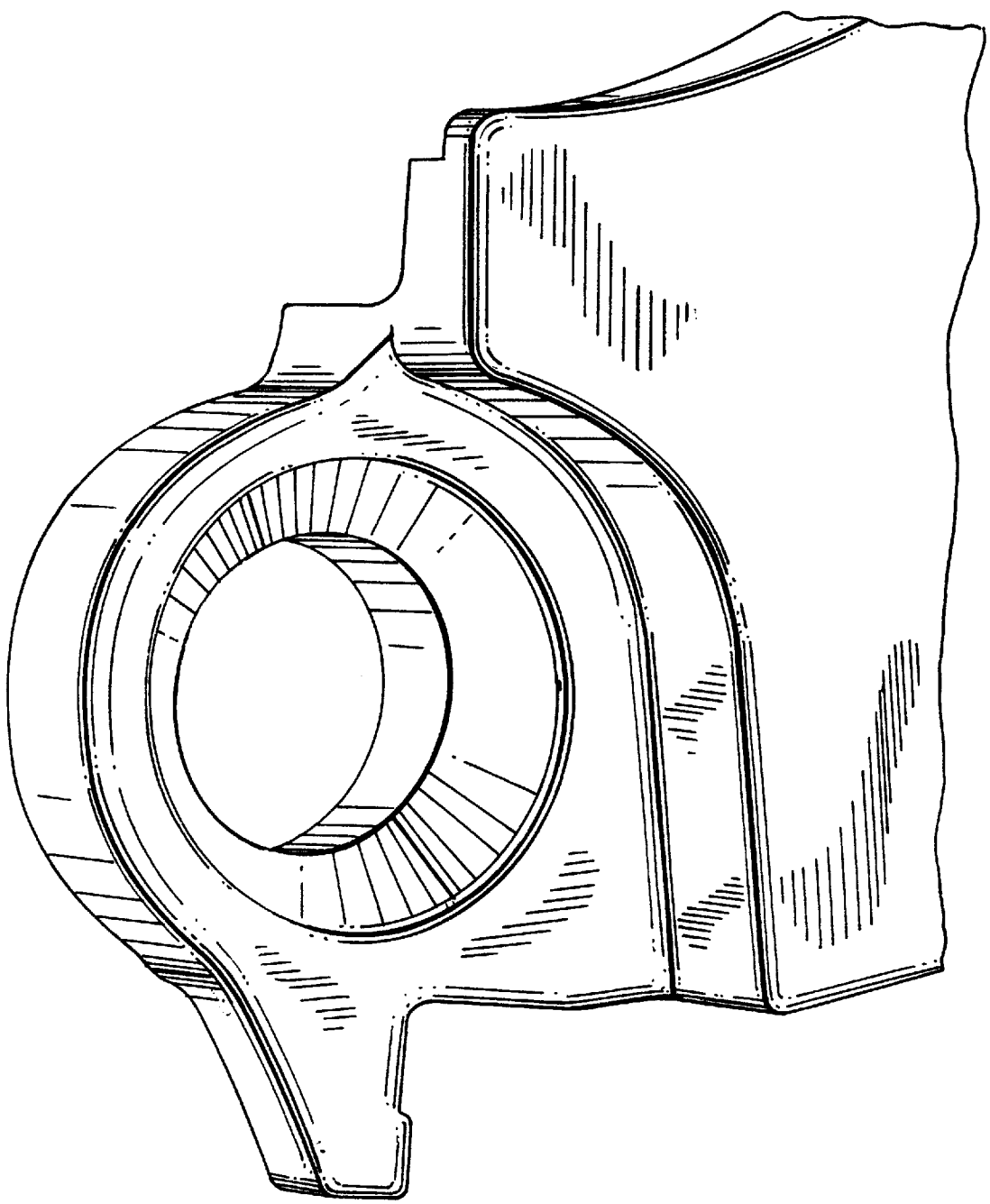
FIG. 14 is a partial perspective view showing further details of the female concave surface of revolution which surrounds the bolt receiving aperture at one end of the coupling segment.
Figure 15:
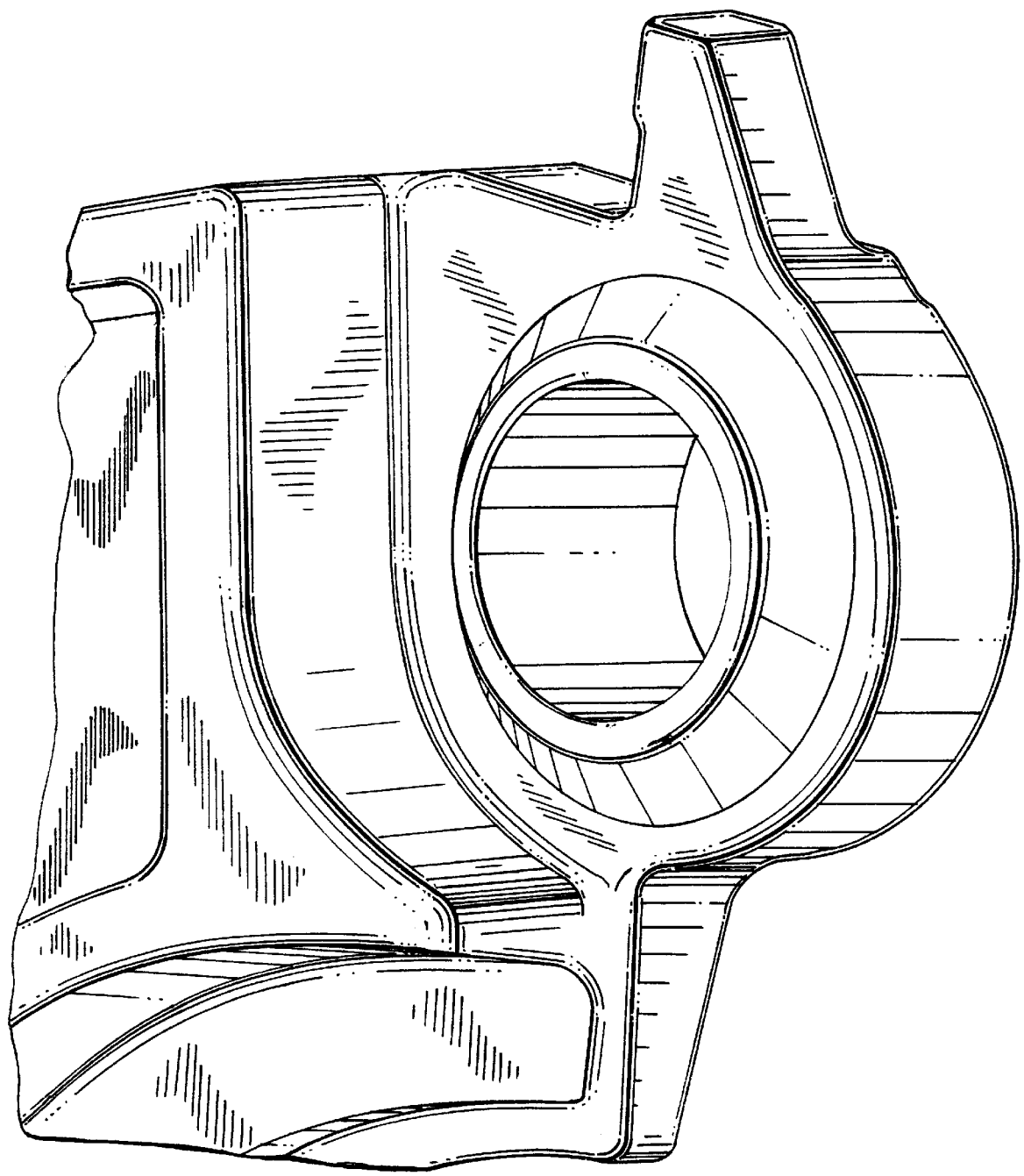
FIG. 15 is a partial perspective view which shows further details of the complementary male convex surface of revolution which surrounds the bolt receiving aperture at the opposite end of the coupling segment.

According to the present invention, interengageable surfaces of revolution 54, 56 surround the bolt receiving apertures at the ends of arcuate coupling segments 50, 52. These interengageable surfaces 54, 56 are shown as conical surfaces, as best illustrated in FIGS. 11, 14, and 15. Alternatively, the interengageable surfaces of revolution can be provided by surfaces of a sphere providing a female concave surface and a male convex surface, or, surfaces that are intermediate or a combination of conical and spherical surfaces. Also identical interengageable surfaces can be provided on one of the coupling segments, i.e., male-male or female-female, for engagement with correspondingly opposite surfaces on the next adjacent segment or segments. This, however, is not preferred in that it will result in dissimilar segments, whereas forming the segments as now discussed will result in a hermaphroditic arrangement of the segments.

As shown in FIG. 7b, if one of the interengageable surfaces 54 is a female conical surface and the other interengageable surface 56 is a male conical surface, then, in the event that the male interengageable surface 56 is presented to the female interengageable surface 54 in any position other than truly concentric with the female interengageable surface, upon movement of those surfaces towards each other along the Z axis, those surfaces will progressively move towards true concentricity as indicated in FIG. 7c. Thus, in the event that the flange segments 50 and 52 are not in true concentricity upon initial assembly, relative movement between the interengageable surfaces 54 and 56 as their connecting bolts are tightened will move the flange segments 50 and 52 into true concentricity as the respective interengagement surfaces 54 and 56 move relative towards each other along the Z axis.

Additionally, because the interengageable surfaces 54 and 56 each are surfaces of revolution, they do not present any impedance to swinging movement of the respective flange segments 50 and 52 relative to each other into a splayed position. In fact, such swinging movement of the respective flange segments 50 and 52 will have the beneficial effect of further moving the interengageable surfaces 54 and 56 into true concentricity with each other as illustrated in FIG. 7c.

Thus, after having inserted a connection bolt through the bolt holes in one of the ends of the respective flange segments, the flange segments easily can be positioned over the pipe in a splayed condition. The bolt can then be finger tightened to move the interengageable surfaces into true concentricity. A bolt can then be inserted through the bolt holes at the opposite ends of the coupling segments, which, at the same time positions the flange segments 50 and 52 in correct orientation for them to be truly concentric when bolt tightened down onto the bottom wall of the pipe groove. At this time, the interengageable surfaces 54 and 56 at the diametrically opposite ends of the flange segments 50 and 52 will have become interengaged, and are further operative upon the insertion of a traction bolt and the application of torque to the traction bolt to move the flange segments 50 and 52 into true concentricity one with the other, and also true concentricity with respect to the pipe axis and the bottom wall of the pipe groove.

Figure 23:
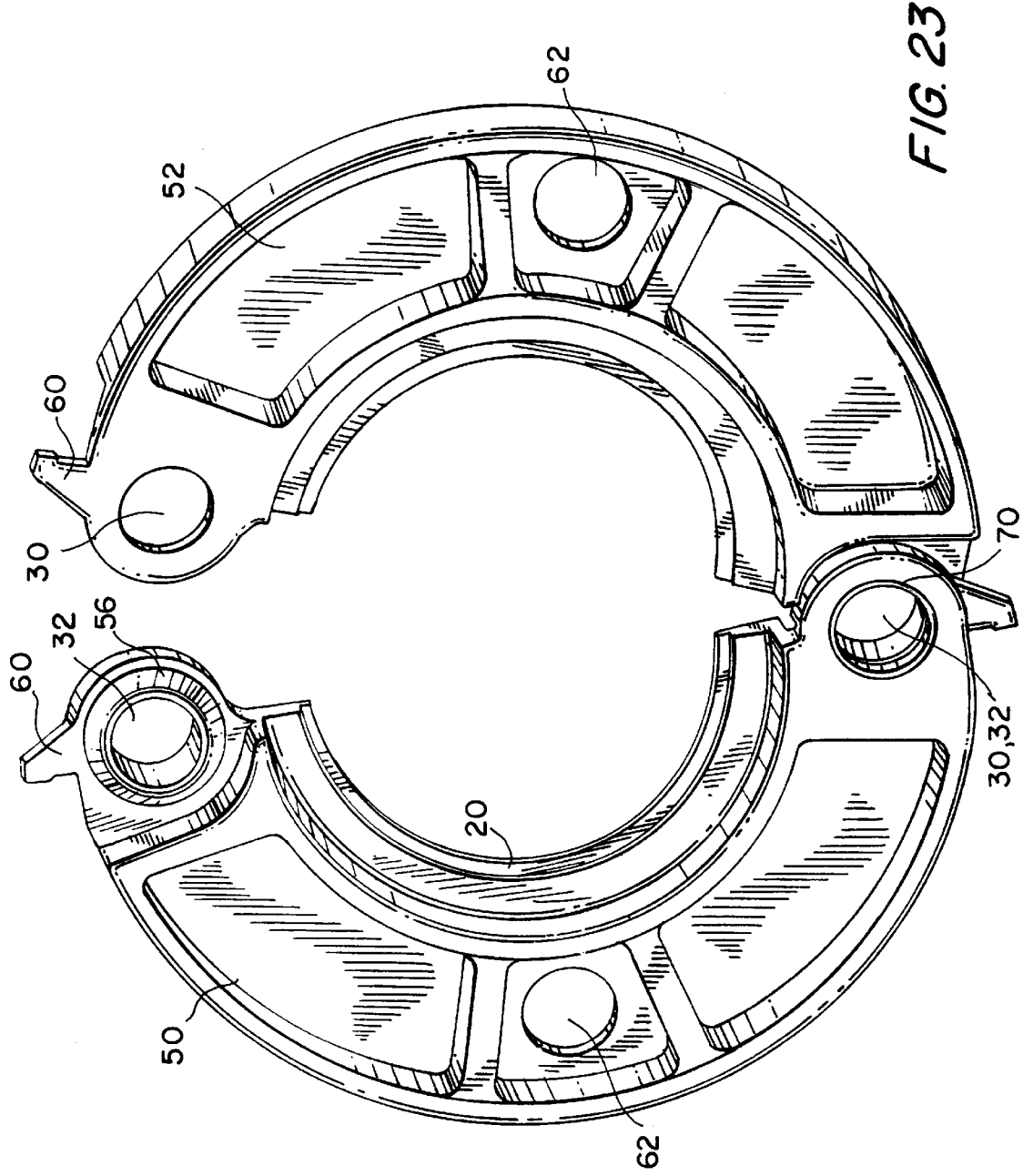
FIG. 23 is an alternative embodiment, generally corresponding to FIG. 16, but in which the coupling segments are initially permanently connected in a hingelike fashion by a bushing member.

Referring now to FIG. 8, the flange segments 50 and 52 are shown interengaged at one of their ends, with the flange segments arranged in a splayed condition, thus permitting the flange segments to be positioned over the pipe 24 by loosely passing a traction bolt (not shown) through the overlapped bolt holes 30–32, and using the traction bolt as a hinge pin. Alternatively, a bolt may first be secured to the fitting 26 (such as the fitting of FIG. 1), then passing the bolt holes 30–32 of the respective flange segments over the shaft of the bolt and also over the pipe. Hence, this bolt will act as a hinge pin around the axis of the respective flange segments, such that these connected segments will be freely hingeable to the splayed condition. As another alternative, as shown in FIG. 23, the flange segments 50, 52 may be permanently and loosely hinge-connected by a bushing 70. The segments 50, 52 can then be swung inwardly into engagement with the pipe groove 22 to bring the opposite bolt holes 30 and 32 into alignment, while at the same time positioning the keys 20 of the respective flange segments in the pipe groove 22, subsequent to which a bolt is then passed through the bolt holes 30 and 32 at the opposite ends of the flange segments, and is torqued down.

Torquing down of the bolts at the respective opposite ends of the flange segments 50 and 52, then acts by virtue of the interengageable conical surfaces 54 and 56 about the bolt apertures 30, 32 to move the bolt holes 30 and 32 into true concentricity with the axis of the traction bolts, and in turn, to move the respective flange segments 50 and 52 into true concentricity with each other and into true concentricity with the bottom wall of the pipe groove 22.

In addition to moving the keys 20 into true concentricity with the bottom wall of the pipe groove 22, the pipe itself, which is not at that time fixed against movement in a plane perpendicular to its longitudinal axis, the coupling segments will adjust in position, further to ensure true concentricity of the bottom wall of the pipe groove and the respective keys of the flange segments 50 and 52.

Further, due to the conicity of the interengageable surfaces 54, 56, the respective ends of the segments 50, 52 and their respective keys will be moving in opposite directions relative to the Z axis as shown by the arrows $Z^2$ FIGS. 9 and 11. This will advantageously cause the keys 20 to clamp onto the adjacent side walls of the pipe groove 22 to provide a truly rigid flange coupler.

FIG. 9 illustrates the manner in which the required female interengageable surface 54 and the male interengageable surface 56 can be provided at the opposite ends of the flange segment 52, the flange segment 50 corresponding to the flange segment 52 in order that the flange segments are truly hermaphroditic. This advantageously requires only a single configuration of flange segment, eliminating the problems in warehousing dual or multiple segments of differing configuration. Also, and most importantly, the possibility that a careless workman might assemble an incorrect flange segment to an incompatible flange segment is removed.

Without regard to whether the flange coupler is provided by two flange segments, three flange segments or a multiplicity of such flange segments, an appropriate number of a single appropriate flange segment will provide the required flange coupler.

Figure 12:
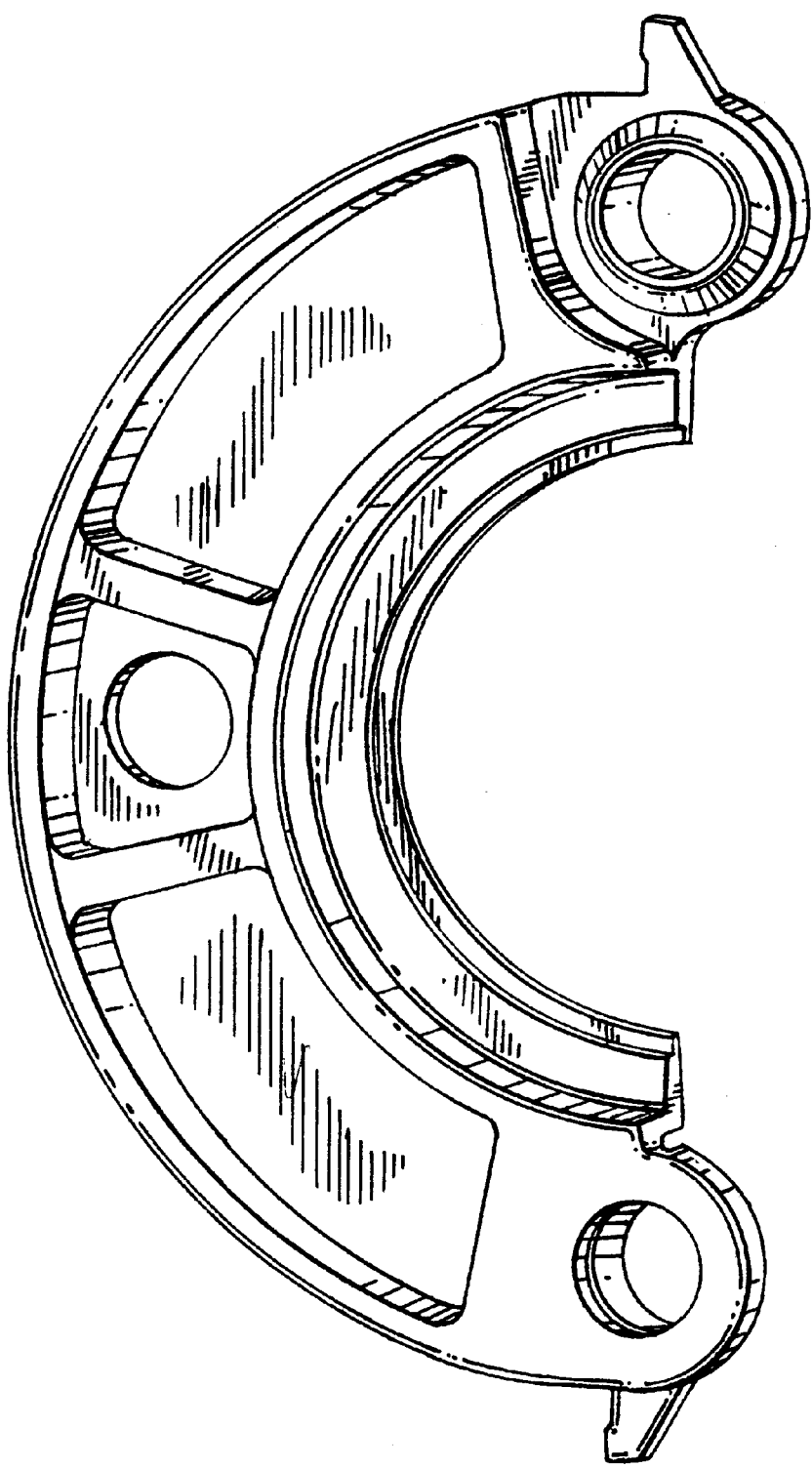
FIG. 12 is a perspective view showing one face of the coupling segment illustrated in FIGS. 8–11.
Figure 13:
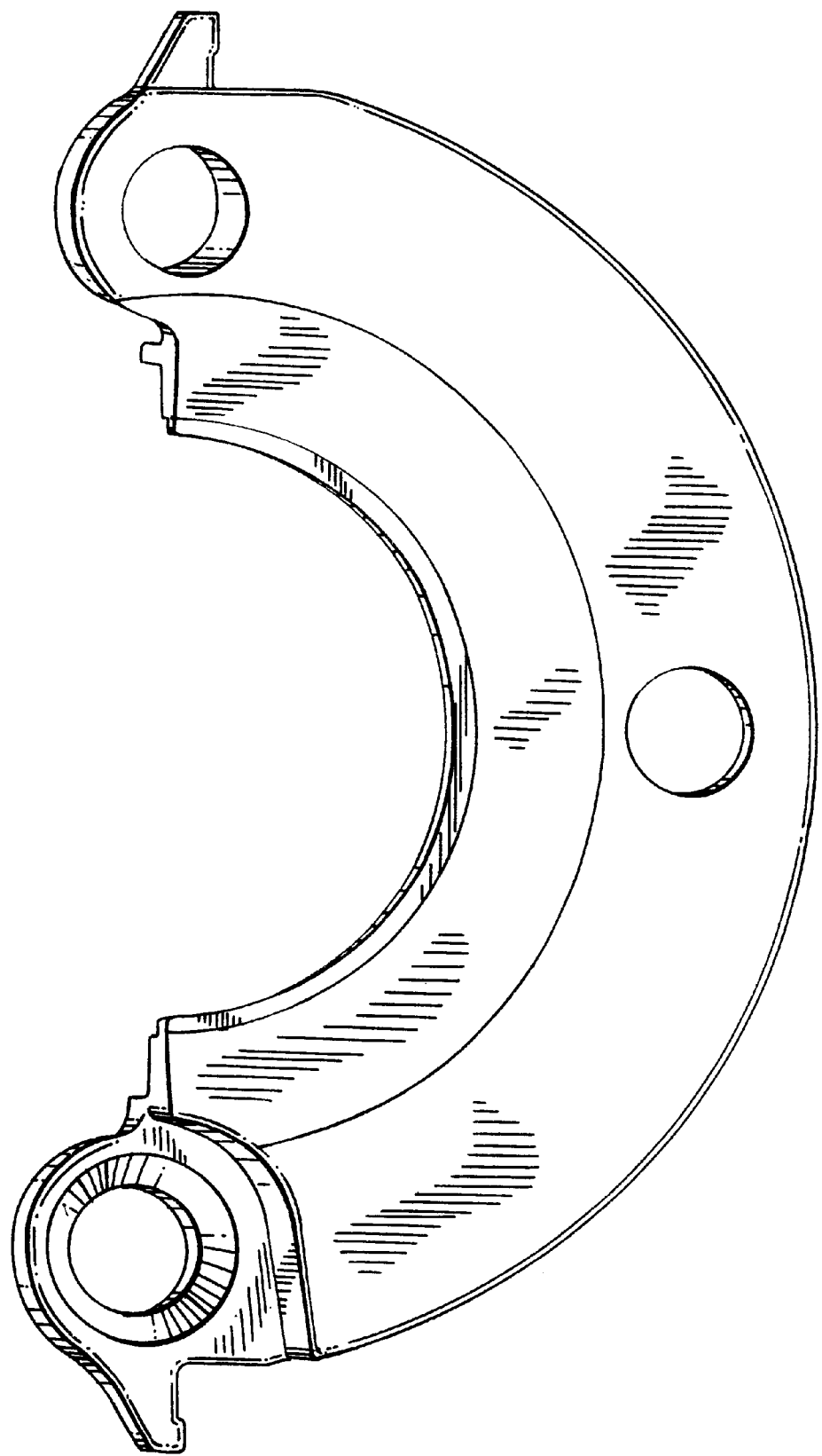
FIG. 13 corresponds to FIG. 12, and shows the reverse side of the same coupling segment.

If one of the flange segments is presented to another flange segment in an incorrect orientation, the flange segments will not interfit, thus providing a direct indication to the workman that one of the flange segments is incorrectly oriented. Optionally, and also preferably, the opposite sides of the respective flange segments are of a texture and surface configuration different to each other, thus to provide the workman with a tactile feel of the correct orientation of the respective segments. Thus as illustrated in FIGS. 8 and 13, the face of the flange coupler to be presented outwardly is preferably a smooth face. The opposite side, as illustrated in FIGS. 10 and 12, includes radially and circumferentially extending webs. This provides the required tactile and visually observable indication of the correct orientation of the flange segment, in addition to the inability of the respective flange segments to be improperly assembled one to the other.

Preferably, in order to assist in closing down the coupler from the splayed condition illustrated in FIG. 8 to the closed position shown in FIG. 10, opposite ends of the respective flange segments are provided with ears 60 that are engageable by pincers or a yoke-type traction device, it should be appreciated that the major closing force is obtained by the engagement of surfaces 54, 56 as the bolts are torqued down.

Also, and as is common in the art, additional bolt holes 62 are provided at positions intermediate the ends of the respective flange segments.

FIG. 11 illustrates diagrammatically in perspective the manner in which the surfaces of revolution providing the interengageable surfaces 54 and 56 are arranged on the respective coupling segments 50 and 52.

As previously explained, the surfaces of revolution 54, 56 about the bolt receiving apertures 30, 32 comprise interengageable conical surfaces. Thus, as the flange segments 50, 52 move towards each other along the X—X axis, even in the event that they are initially misaligned, the reaction force produced by relative movement along the X—X axis will progressively force the segments into true concentricity one with the other. The employment of conical surfaces is in fact optional. For example, the female interengageable surface can be in the form of a surface of a sphere, and, in the male interengageable surface 56 similarly can be in the form of a surface of a sphere of identical diameter to that of the interengageable female surface 54.

As illustrated in FIG. 9, the male and female surfaces of revolution 54, 56 can be of minor axial length, in order to facilitate fitting of the coupler keys 20 of the coupler segments 50, 52 into the pipe groove 22 and interfitment of the surfaces of revolution. Further, and as illustrated in FIGS. 9 and 11, interfitment of the surfaces of revolution and subsequent tightening down of the bolts will cause the adjacent ends of the segments to move oppositely relative to the Z—Z axis in the directions of the arrows 22 to opposite sides of the X—Y plane for their keys to become offset at the respective ends of the segments and move into clamping engagement with the mutually presented side walls of the pipe groove 22.

FIGS. 12 and 13 show in perspective, the opposed sides of one of the coupling segments, such as 50, 52. Each of these coupling segments includes a conical male convex surface of revolution 56 about one of the bolt receiving apertures 32, and a concave complementary female conical surface of revolution 54 about the opposite bolt receiving aperture 30 of the coupling segment 50, 52.

FIGS. 14 and 15 show further details of the complementary conical surfaces of revolution which may be employed according to a preferred embodiment of the present invention.

Figure 16:
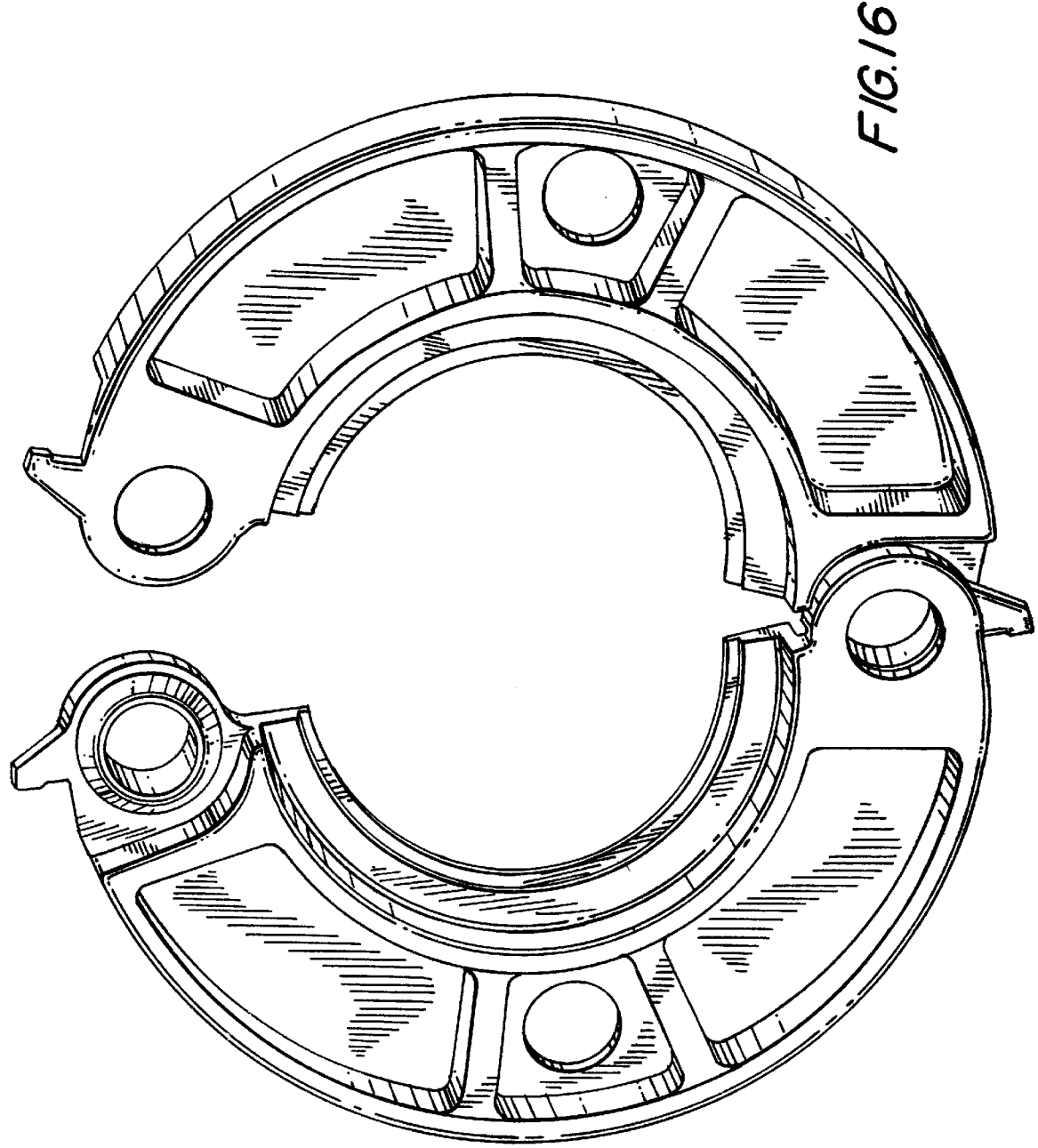
FIG. 16 is a perspective view, generally corresponding to FIG. 8, showing a pair of identically configured generally semi-circular coupling segments of the present invention in initial engagement, but with the connecting bolt removed and the grooved pipe not shown for purposes of simplicity.
Figure 17:
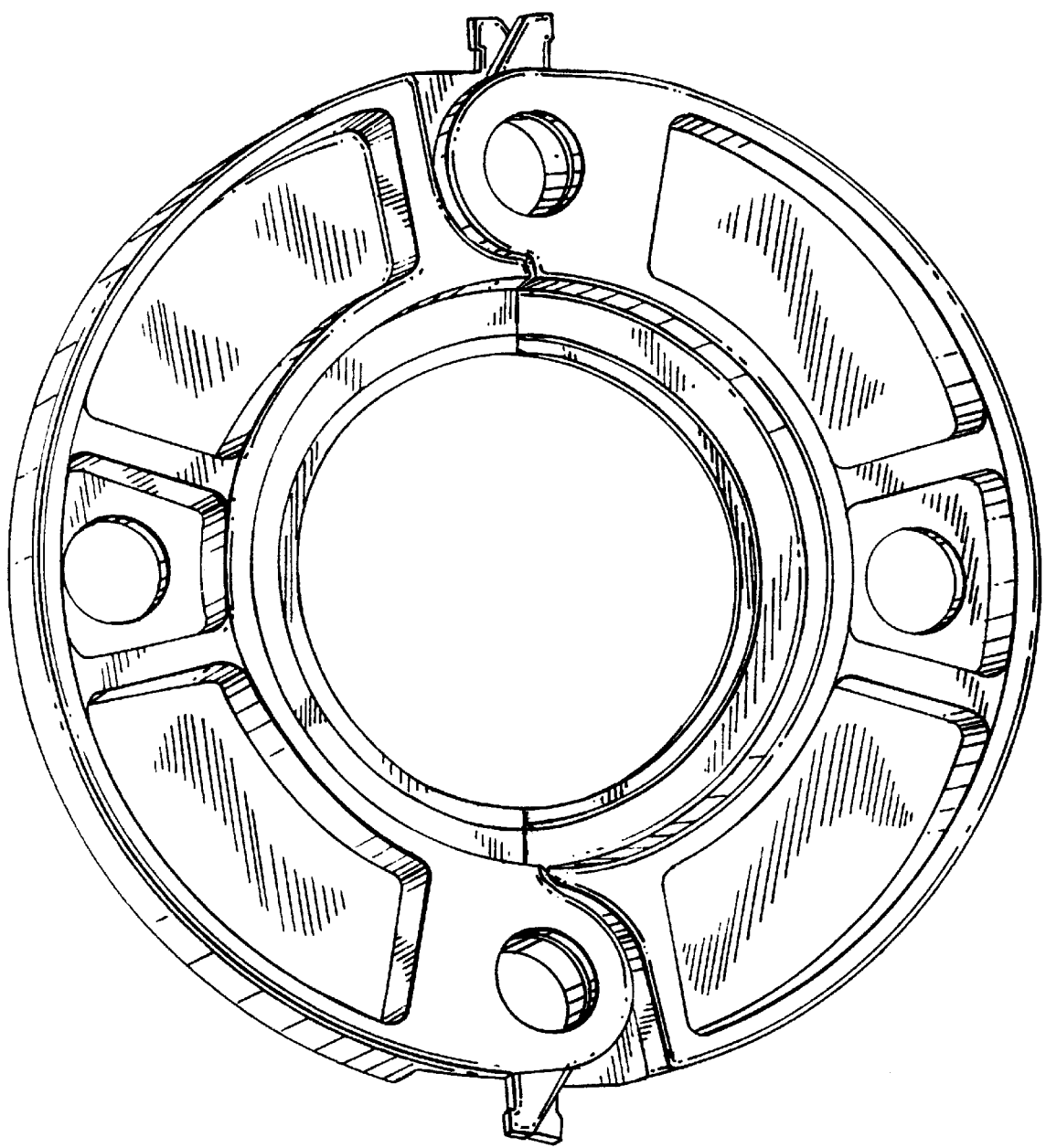
FIG. 17 corresponds to FIG. 16, but shows the coupling segments fully engaged, again with the connecting bolts removed and the grooved pipe not shown.

FIGS. 16 and 17 are perspective views which correspond to FIGS. 8 and 10, and show the initial engagement of coupling segments 50, 52, and their final disposition. For purposes of clarity, the connecting bolts and pipe are not shown.

Figure 18:
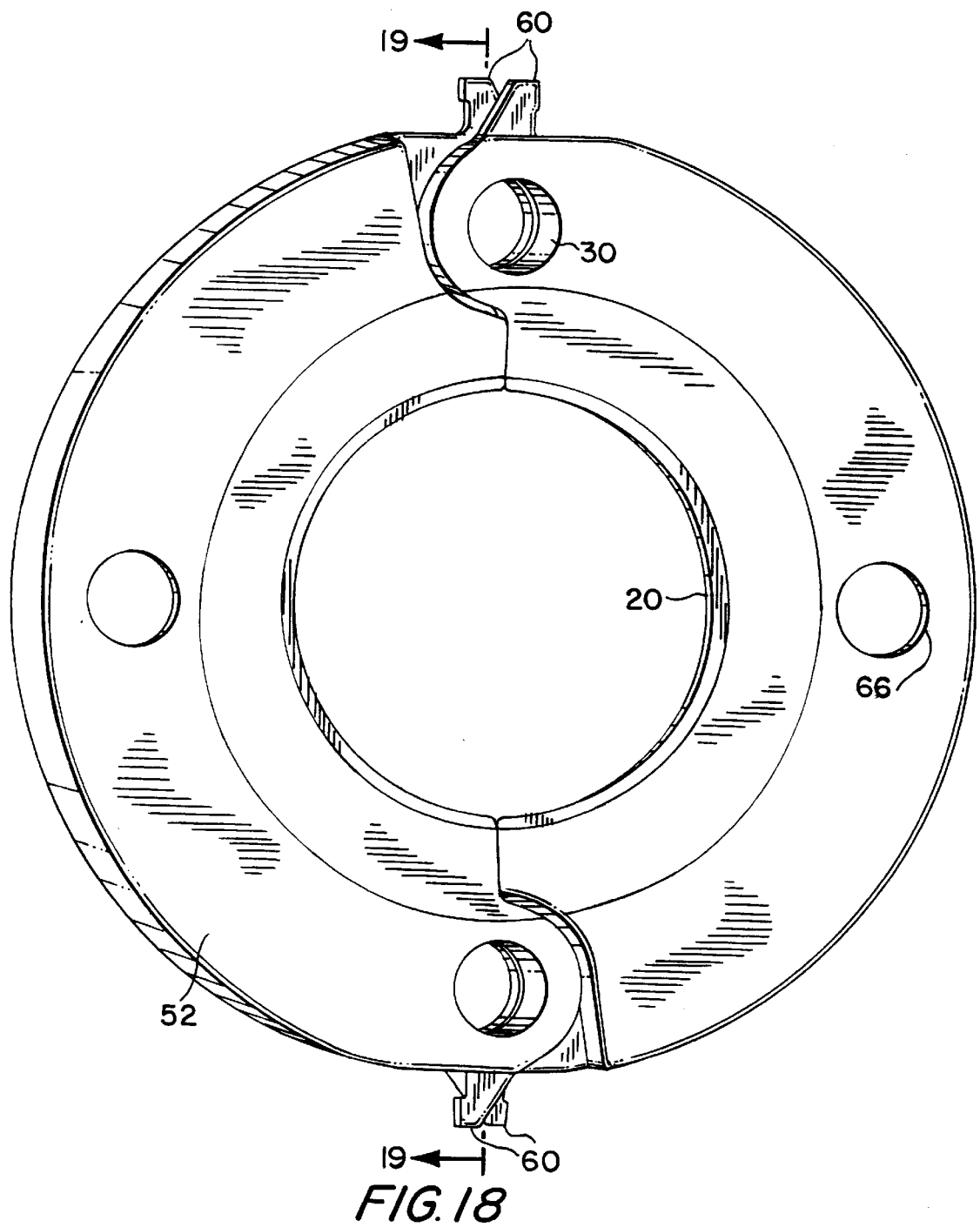
FIG. 18 corresponds to FIG. 17, but shows the reverse side of the fully assembled coupling segments.
Figure 19:
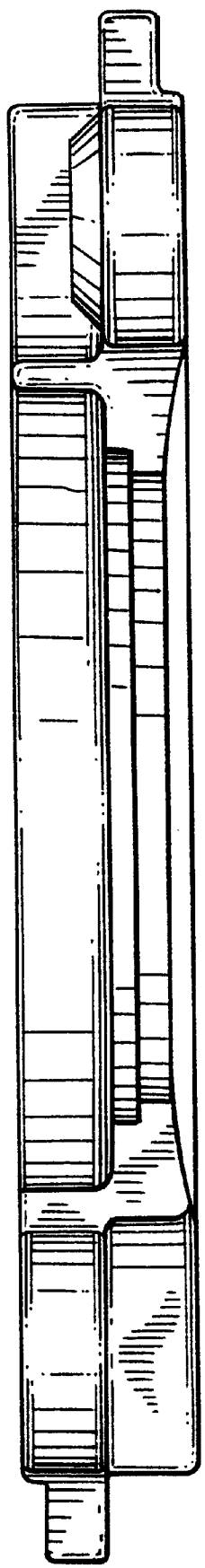
FIG. 19 is a partially cutaway cross sectional view along the line 19—19 as shown in FIG. 18, and looking in the direction of the arrows.

FIG. 18 corresponds to FIG. 17, but shows the reverse side of the connected coupling segments 50, 52, with FIG. 19 being a partial cross section therethrough as shown by the line 19—19.

Figure 20:
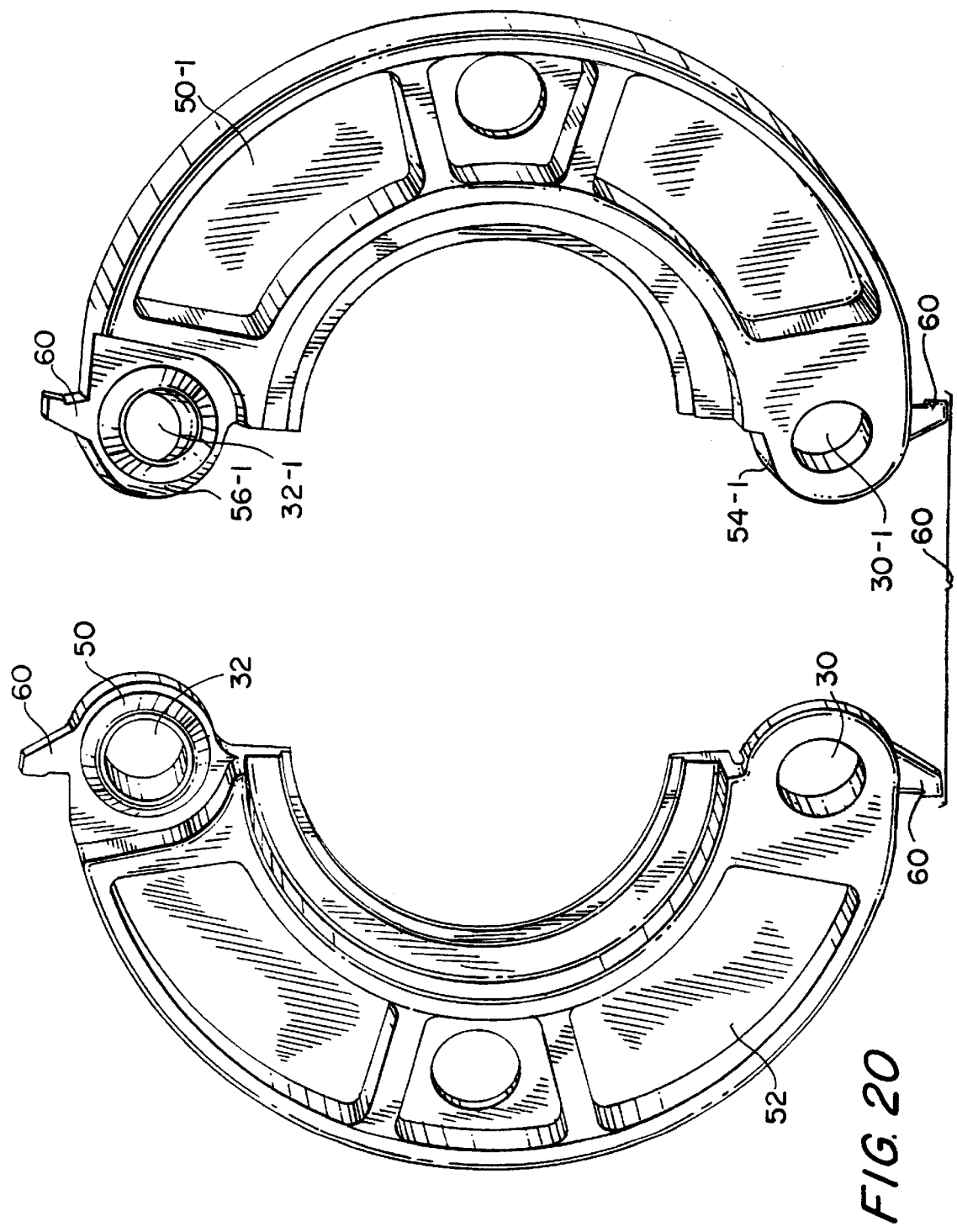
FIG. 20 shows an additional optional feature of the present invention in which the conical surfaces about the bolt receiving apertures of a closely sized coupling segment are reversed to provide an anti-mismatch feature.
Figure 21:
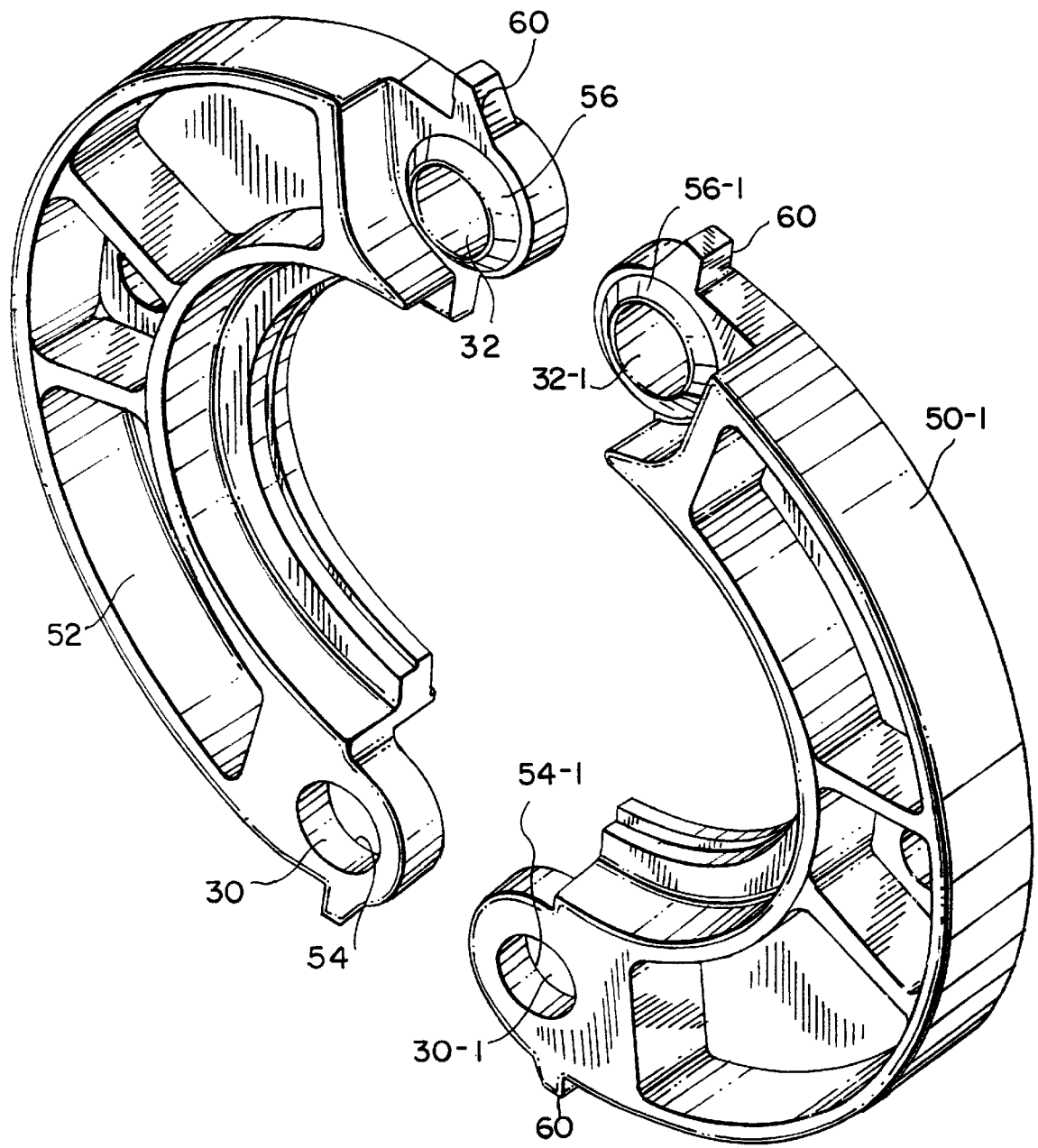
FIG. 21 is a perspective view, corresponding to FIG. 20, but further showing how the anti-mismatch feature provides interference relationship between the conical surfaces of closely sized coupling segments to prevent their connection.
Figure 22:
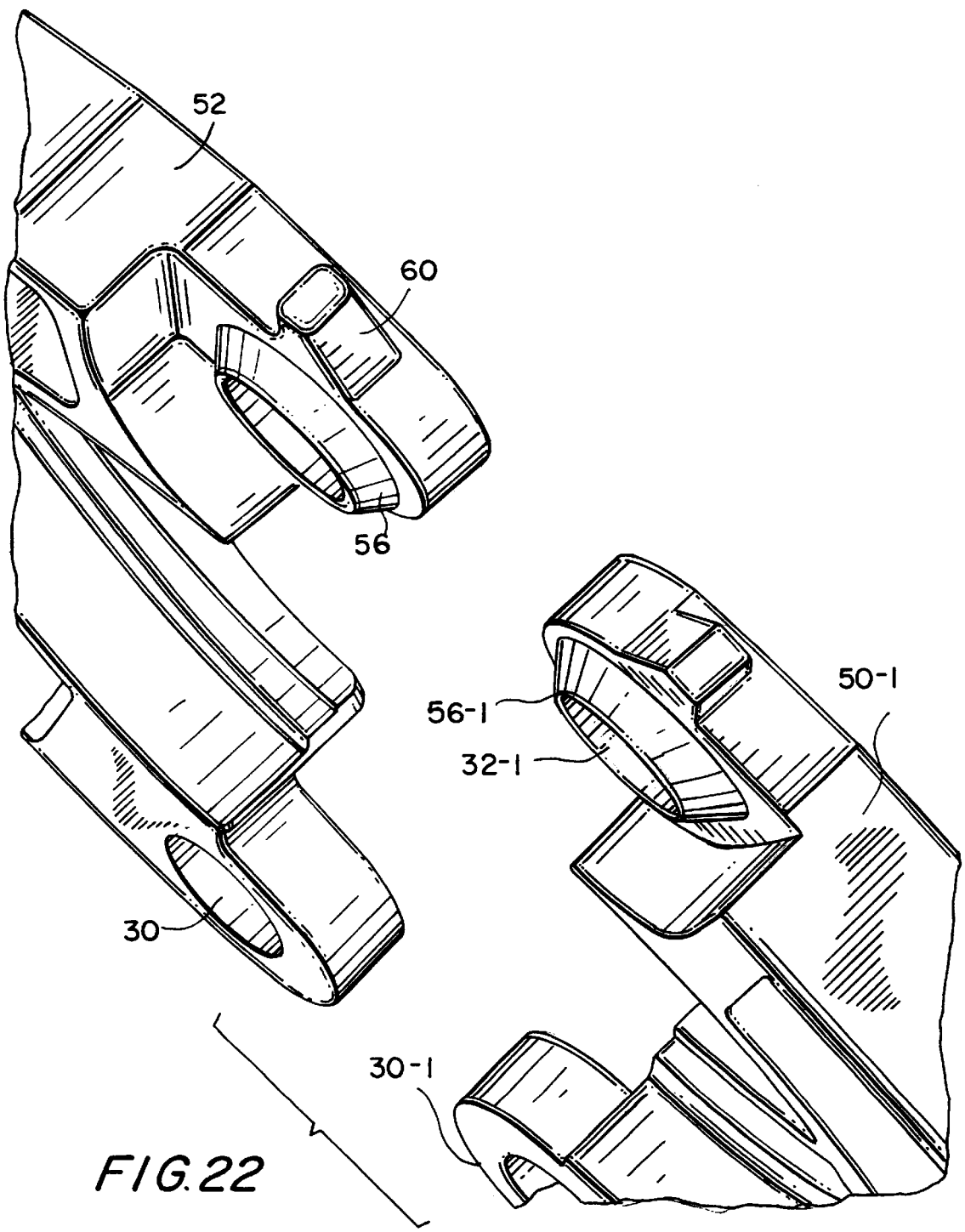
FIG. 22 is a partial perspective view, corresponding to FIGS. 20 and 21, showing further details of the interference relationship between closely sized coupling segments to prevent their mismatch.

FIGS. 20–22 show a further feature which may be incorporated in conjunction with the present invention. In order to prevent the inadvertent mixing of near, but different, size individual arcuate coupling segments this concept, which is disclosed in copending U.S. patent application Ser. No. 09/368,680 of Aug. 5, 1999, provides for an interference relationship should an attempt be made to connect such closely sized coupling segments. As incorporated in conjunction with the present invention, near sized coupling segment 50-1 will have the location of its convex surface of revolution 56-1 about bolt hole 32-1 and complementary concave surface of revolution 54-1 at the opposite end thereof about bolt hole 30-1, reversed with respect to the location of surfaces 54 and 56 of the aforediscussed coupling segment 52. Thus, as shown in FIGS. 20–22 the end surfaces of arcuate segments 52 and 50-1 will be in interference relationship, thereby preventing the connection of such closely sized arcuate coupling segments.

FIG. 23 shows an alternative embodiment of the present invention in which the adjacent coupling segments 50 and 52 are initially loosely connected together in hingelike manner by bushing 70 which extends through their overlapped bolt receiving apertures 30, 32. The bushing will have sufficient play to allow the complementary conical surfaces of revolution to move into appropriate surface contact. A tightening bolt will then be inserted through bushing 70. This construction, while facilitating the handling of the individual segments 50, 52, may be used where there is less anticipated eccentricity in the shape of the pipe 24. After the arcuate segments 50, 52 of FIG. 23 are placed about its pipe (not shown), bolts are inserted through two sets of overlapped apertures 30, 32, with the tightening of the bolts bringing these coupling sections 50, 52 into both circumferential and radial alignment about the groove of the pipe.

Accordingly, it should be appreciated that in accordance with the present invention the positive engagement of the conical surfaces of revolution 54, 56 about each of the bolt receiving apertures 30, 32 provides improved concentricity and key engagement with the pipe groove. Further, the utilization of the tightening of the bolts to bring the segments 50, 52 into alignment, as opposed to the prior use of pliers about the ears 60, provides a substantial mechanical advantage, thereby further facilitating concentricity between the segments 50, 52 and improving the seating of the key 22 within the pipe groove 20 and enhancing the pressure that the coupler is able to safely withstand.

As a further advantage of the present construction, the manner in which the interengaged conical surfaces 54, 56 about the bolt receiving apertures brings the segments 50, 52 into concentricity requires less precision in the manufacture of the bolt receiving apertures. This advantageously simplifies and reduces the manufacturing costs.

It is a further advantage of the present invention, the conical interengagement about the bolt receiving apertures provides increased rigidity compared to the planar contact of the typical prior art constructions.

Accordingly the segmented flange coupler of the present invention provides functional benefits, enhanced assembly procedures, and superior performance versus the previously known segmented flange couplers.

While the present invention has been described in conjunction with preferred embodiments thereof, other modifications will suggest themselves to those familiar with segmented flange couplings, all of which are considered to be within the spirit and scope of the invention as defined by the following claims.

I claim:

1. A coupling segment for use in a segmented flange coupler formed of a plurality of said coupling segments, said coupling segment including:

an arcuate body portion having opposite ends, said opposite ends including bolt receiving apertures for the end-to-end connection of successive coupling segments;

one of said ends including a male surface of revolution about its bolt receiving aperture and having an axis extending transverse to said body;

the other opposite arcuate end including a female surface of revolution about its bolt receiving aperture and transversely to said body; said respective surfaces of revolution being of complementary configuration, and each interfittable with a complementary surface of revolution of another of said coupling segments, the engagement of said complementary surfaces of revolution adapted to move said coupling segments into both circumferential alignment and radial concentricity during the tightening of bolts extending through said bolt receiving apertures.

2. The coupling segment of claim 1, in combination with another one of said coupling segments to provide a segmented flange coupling, said male surface of revolution at one end of one of said coupling segments being interfittable within said female surface of revolution at one end of said coupling segments;

whereby, when said male surface of revolution is introduced into said female surface of revolution, said respective coupling segments are rotatable about said transverse axis, and, as said male surface of revolution is introduced into said female surface of revolution and a bolt is placed through their respective bolt receiving apertures and tightened, said respective transverse axes are circumferentially and radially moved towards coincidence with one another to move said coupling segments into concentricity with one another.

3. The coupling segment of claim 1, in which said surfaces of revolution are conical, with the male surface at one arcuate end being convex and the female surface at the other opposite end being convex.

4. The coupling segment of claim 1, wherein said male and female surfaces of revolution provide a hermaphroditic coupling segment assemblable to another of said coupling segments, said surfaces of revolution providing for movement of said transverse axes towards circumferential and radial alignment with each other.

5. The coupling segment of claim 1, in which one face of said coupling segment is of a configuration different from the opposite face of said coupling segment, whereby to provide a visual and tactile feel of the correct positioning of said coupling segment in relation to the next adjacent coupling segment.

6. A coupling segment for use in a segmented flange coupler formed of a plurality of said coupling segments, said coupling segment including:

an arcuate body portion having opposite ends, said opposite ends including bolt receiving apertures;

at least one of said ends including a male surface of revolution about its bolt receiving aperture, said aperture having an axis extending transverse to said body;

said male surface of revolution being interfittable in a corresponding female surface of revolution about a bolt receiving aperture in a next-adjacent coupling segment, said female surface of revolution of said next-adjacent coupling segment having an axis extending through its bolt receiving aperture and transverse to said body of said next adjacent coupling segment;

said respective surfaces of revolution being of complementary configuration and interfittable one with the other to circumferentially and radially move said adjacent coupling segments into alignment during the tightening of a bolt extending through their bolt receiving apertures.

7. A coupling segment for use in a segmented flange coupler formed of a plurality of said coupling segments, said coupling segment including:

an arcuate body portion having opposite ends, said opposite ends including bolt receiving apertures.

at least one of said ends including a female surface of revolution about its bolt receiving aperture, said aperture having an axis extending transverse to said body;

said female surface of revolution being interfittable with a male surface of revolution provided on a next-adjacent coupling segment, said male surface of revolution having an axis extending through its bolt receiving aperture and to said body of said next-adjacent coupling segment;

said respective surfaces of revolution being of complementary configuration and interfittable one with the other to circumferentially and radially move said adjacent coupling segments into alignment during the tightening of a bolt extending through their bolt receiving apertures.

8. The coupling segment of claim 6, wherein said male surface of revolution is a convex cone.

9. The coupling segment of claim 7, wherein said female surface of revolution is a concave cone.

10. A segmented flange coupler including a successive plurality of arcuate coupling segments adapted to be bolt connected in an end-to-end relationship to form a circle about a pipe member, and bolt means for connecting the successive arcuate segments;

each of said arcuate coupling segments including a bolt receiving aperture at its opposed ends, with a surface of revolution about each bolt receiving aperture;

the surfaces of revolution at the connected ends of successive arcuate coupling segments being paired in overlapped complementary male and female relationship, whereby the tightening of the bolt means radially and circumferentially moves said successive arcuate segments into alignment as said pairs of complementary surfaces of revolution about said bolt receiving apertures are moved into intimate surface engagement.

11. The segmented flange coupler of claim 10, wherein said surfaces of revolution are conical with said male surface being convex and said female surface being concave.

12. The segmented flange coupler of claim 11, wherein the conical surface of revolution at one end of each coupling segment is concave and the conical surface of revolution at the other end of each coupling segment is convex.

13. The segmented flange coupler of claim 10, wherein at least one of the overlapped ends carrying a pair of said complementary surfaces of revolution about their bolt receiving apertures is permanently connected in hinged relationship by a bushing extending through their respective bolt receiving apertures, said bushing including a central aperture for receiving said bolt means for the tightened engagement of said complementary surfaces of revolution surrounding said bushing.

14. In a series of a plurality of segmented flange couplings of predetermined successive sizes, wherein each of the couplings in the series is sized to have a diameter that is successively larger than the diameter of a previous coupling in the series and smaller than the diameter of a next coupling in the series, and such that each coupling securably engages a circumferential groove about a pipe of correspondingly sized diameter to the diameter of the coupling, with each coupling comprising a plurality of individual arcuately-shaped segments capable of being assembled in end-to-end adjacent relationship for completely encircling the groove of the pipe;

each of the individual arcuately-shaped coupling segments includes:
   an arcuately shaped body portion having a pair of opposite ends, with the opposite ends each having fastener-receiving apertures, through which fasteners are placed such that adjacent segments encircling the groove of the pipe are fastened to one another in end-to-end relationship;
   such that one of the ends of each segment includes a male surface of revolution about its fastener-receiving aperture and has an axis extending transverse to the shaped body portion; and
   further such that the opposite end of each segment includes a female surface of revolution about its fastener-receiving aperture and has an axis extending transverse to the shaped body portion;
   the respective male and female surfaces of revolution being of complementary configuration, and each being interfittable with a complementary surface of revolution of another identically configured coupling segment to move the coupling segments into both circumferential alignment and radial concentricity during installation of the fasteners through the fastener-receiving apertures;
   the location of the male and female surfaces of revolution on the individual segments of any one of the successively sized series of segmented flange couplings being reversed with respect to the location of the male and female surfaces of revolution on the individual segments of both the immediately adjacent smaller and immediately adjacent larger ones of the successively sized series of segmented flange couplings, in order to provide anti-mismatch means on the individual segments of any segmented flange coupling to thereby prevent the coupling of an individual segment of one sized coupling to an individual segment of another sized coupling.

15. The series of successively sized segmented flange couplings according to claim 14, wherein the surfaces of revolution surrounding the fastener-receiving apertures are conical, with a convex surface at one end of each individual coupling segment and a concave surface at the opposite end of each coupling segment, such that the anti-mismatch means is provided by the interference engagement of the convex projections of two successively sized coupling segments.

* * * * *